May 17, 1932.  L. H. BROWN  1,859,020
METHOD OF AND APPARATUS FOR MEASURING MATERIALS
Filed April 30, 1929
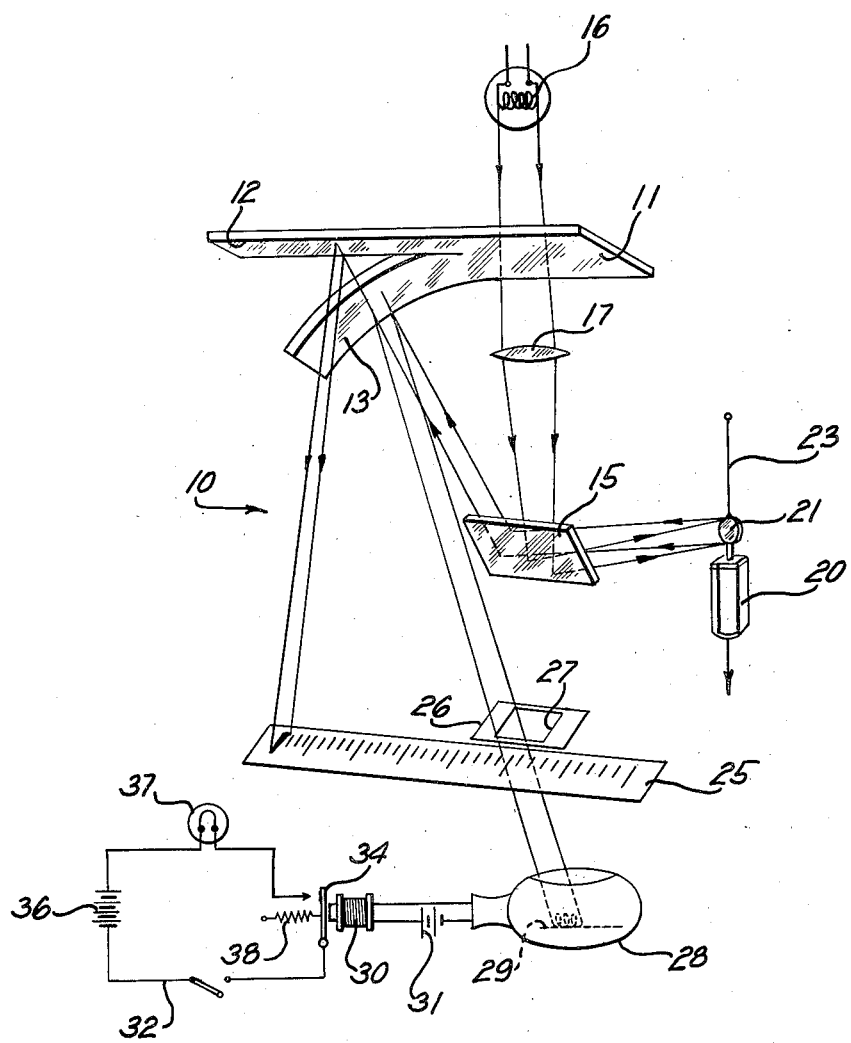
Inventor
Laurel H. Brown
By [signature], Att'y.

Patented May 17, 1932

1,859,020

UNITED STATES PATENT OFFICE

LAUREL HERMAN BROWN, OF BERWYN, ILLINOIS, ASSIGNOR TO WESTERN ELECTRIC COMPANY, INCORPORATED, OF NEW YORK, N. Y., A CORPORATION OF NEW YORK

METHOD OF AND APPARATUS FOR MEASURING MATERIALS

Application filed April 30, 1929. Serial No. 359,339.

This invention relates to a method of and apparatus for measuring materials, and more particularly to a method of and apparatus for measuring the electrical characteristics of materials.

Heretofore, in measuring electrical impulses and in indicating the measurement of electrical impulses, it has been the practice in some instances to read deflections of a galvanometer or other impulse affected instrument by means of a light beam reflected upon a graduated scale from a pivoted mirror attached to the instrument; and in other instances, to utilize a reflected light beam to operate a photo-electric cell.

Objects of the present invention are to provide a method of and an apparatus for determining indications of measuring instruments which will be facile, economical, accurate and reliable.

One embodiment of the invention contemplates the provision of a mirror having plane and curved reflecting portions so positioned with respect to a reflecting galvanometer that a single light beam is directed from a stationary mirror to the galvanometer mirror and reflected therefrom to the stationary mirror, and thence to the plane and curved surfaces of the mirror with the result that the light beam is divided into two portions, which simultaneously give a reading upon a graduated scale and, by means of a photo-electric cell, operate a remote electrically-controlled signal.

These and other objects of the invention will be apparent from the following detailed description read in connection with the accompanying drawing forming a part thereof and in which The figure represents a diagrammatic view in perspective of a measuring apparatus embodying one form of the invention.

Referring to the drawing a measuring apparatus generally indicated by the numeral 10 comprises a stationary horizontally disposed bifurcated mirror 11 having a plane section 12 and a concavely curved section 13. A stationary rectangular deflecting mirror 15 is situated beneath the mirror 11 and in line with an incandescent lamp 16 or other suitable source of light, and a suitable condensing lens 17. The lamp 16 which may be connected to any suitable source of electricity, not shown, constitutes a source of light which projects light beams downwardly in back of the bifurcated mirror 11, as shown in the drawing, through the lens 17, which increases the intensity with which the light strikes the deflecting mirror 15 by condensing the beams and forming thereof a finger of light. Offset from the stationary deflecting mirror 15 is a conventional type of suspended reflecting galvanometer or other suitable inductively actuated testing instrument 20, having a mirror 21 mounted thereon. The galvanometer mirror 21 is suspended in the usual manner by and revolvable upon a vertically extending thread 23 to permit its ready response to electrical impulses which are inductively impressed upon galvanometers of this conventional type when used for testing the conductivity or resistance of electrical materials.

A horizontally disposed graduated measuring scale 25 is stationed directly beneath the birfucated mirror 11, and it has been found most convenient to so place the graduated scale 25 that the deflecting mirror 15 is midway between the scale and the mirror 11. The scale 25 may be graduated to indicate readings in any desired system of values. In the present case it is graduated in thirty-five divisions which may be two millimeters apart, so that the total reading afforded by the scale in such case may be seventy millimeters. In the present embodiment, the scale is intended to indicate readings of the galvanometer 20 which has a sensitivity of .001 microampere, each millimetric division of the scale indicating a resistance value in the rubber insulation being tested of 100 megohms. An opaque screen 26 is positioned horizontally and immediately adjacent one side of the graduated scale and is mounted in guideways or any other suitable means (not shown) to afford the screen a slight travel in a horizontal plane longitudinally of the scale 25. The screen 26 is provided with a rectangular slot 27 which extends parallel with the graduated scale 25 a distance corresponding to the distance between the forty-fifth and fifty-fourth millimeter readings. Since the device is applicable to the testing of many kinds of material and characteristic other than rubber insulation and the electrical resisting strength thereof, and since it is obvious that a number of different grades of insulation may be tested, the position of the screen may be altered to accord with the varying values in such cases.

A photo-electric cell 28 of any usual type having a light-sensitive element 29 is so disposed immediately beneath the opaque screen that a beam of light reflected from the curved section 13 of the bifurcated mirror 11 may pass through the slot 27 and impinge squarely upon the sensitized element 29 of the cell 28. The distance between the individual portions of the apparatus which has been described is approximately determined by placing the sensitive portion 29 of the photo-electric cell 28 slightly to the left of the midpoint of an imaginary circle, of the circumference of which the arc described by the curved section 13 of the mirror 11 forms a segment. The photo-electric cell 28 is connected in series with a relay 30 and a battery 31. An auxiliary signal circuit 32 is provided including an armature 34 of the relay and the associated contact, a battery or other suitable source of power 36, and a signal lamp 37. The circuit 32 is maintained open against the action of a spring 38 upon the armature 34 by the attractive force exercised by the relay 30 when a light beam is playing on the photo-electric cell.

From the foregoing, it may be observed that when it is desired to use the above described apparatus in testing, for instance, one-thousand foot reels of rubber-covered copper wire in order to determine the resistance of the insulation, the lamp 16 is illuminated from any suitable source of power (not shown) to project a beam of light downwardly through the lens 17 to the stationary mirror 15, which in turn deflects the beam into the galvanometer mirror 21. Concurrently, the lamp 37 is lighted by operation of any suitable switching means which is included in the circuit. Before a measurement is taken, the light beam is reflected from the mirror 21 to the deflecting mirror 15, and thence upwardly and diagonally to the longitudinal midpoints of the plane section 12 and the curved section 13 of the bifurcated mirror. One-half of the beam is reflected from the plane section to the extreme left of the graduated scale 26, and the other half is reflected from the curved section 13 to the sensitive element 29 of the photo-electric cell 28.

When the operator applies the test conditions to the material, the galvanometer 20 and mirror 21 rotate on the thread 23 to the right, and the angle of the beam at the deflecting mirror 15 is correspondingly varied. The portion of the beam resting upon the plane section 12 moves to the right toward the base portion of the mirror 11, and the beam reflected from the plane section moves to the right along the graduated scale until, when it comes to rest in accordance with the extent of the galvanometer's revolution, it will be found to point out on the scale in millimeters a quantitative reading of the resistance of the insulation in megohms.

Simultaneously therewith, that half of the light beam which is reflected from the curved section 13 is moved slightly to the right, across the sensitive portion 29 of the photo-electric cell. Due to the fact that the reflecting surface 13 describes an arc which is the circumference of a circle having the half-beam for a radius, the travel of the latter beam is approximately one-sixth the travel of the beam which plays upon the scale from the plane section. It is apparent therefore, that while the half-beam from the plane section is traversing the scale for a distance of fifty-four millimeters from the left, the half-beam from the curved section is traversing the width of the slot, or a distance of nine millimeters. While the beam impinges fully upon the sensitive portion 29 of the cell, sufficient current flows through the relay 30 from the battery 31, to cause it to operate and attract its armature 34, thereby opening the signal circuit and extinguishing the signal lamp 37. By this means, an operator applying the test at a point remote from the scale 25 is enabled to determine, when the lamp 37 is not lighted, that the insulation is possessed of the desired amount of resistance. When the insulation is deficient in resistance, the deflection of the galvanometer mirror is correspondingly greater, the angle of reflection at the mirror 15 narrows, the portions of the beam continue to advance to the right along the plane and curved surfaces until they unite on the unitary portion of the mirror 11, the beam from the plane section advancing into the fifty-fifth millimetric reading on the scale and the other beam moving away from the sensitive portion 29 of the photo-electric cell to the right. The relay is thus de-energized to permit the closing of the signal circuit by the relay 30, the signal lamp 37 is illuminated by the signal circuit 32 to warn the operator that the insulation is deficient in resistance, and the sample is discarded or otherwise classified for condemnation.

In cases where the galvanometer 20 is not perfectly damped, there is a tendency in some instances for it to undergo a pronounced back-swing to the left, when the exploring circuit of the galvanometer is opened after a test. By positioning the deflecting mirror 15 so as to cause the deflected beam to initially strike the mid-points of the sections 12 and 13, before the halves of the beam start their normal rightwardly travel, confusion in the mind of the operator is avoided. Since the effect of the back-swing as indicated on the scale 25 is greater by six times than it is on the sensitive portion 29 of the photoelectric cell, it has been found that the back-swing, though markedly noticeable on the scale, is insufficient to cause the beam directed from the curved section 13 to move leftwardly from the sensitive cell. Accordingly, the lamp 37 is not affected by such a back-swing, and may be depended upon to indicate only the sufficiency or insufficiency of the insulation of the sample.

It has been found possible, in using the above described method and apparatus, to materially reduce the labor necessary to make tests of the character described. By varying the width of the slot 27 in proportion as the scale 25 has been marked to indicate the acceptable limits of the insulating properties, and by positioning the reflecting elements in such manner that the travel of the beam reflected from curved section 13 is proportional to the travel of the beam reflected from the plane section 12 as the width of the slot 27 is proportional to the range of acceptable values on the scale 25, an operator is enabled to determine by glancing at the lamp 37 whether or not the sample is acceptable. In such manner the employment of an additional workman for the purpose of reading the scale 25 to determine the value of the resistance in a sample is obviated.

It is apparent that any suitable electrically actuated signal, such as a buzzer, bell, etc., may be used in the signal circuit 32 in place of the lamp 37, and it is also obvious that several conventional methods of wiring the auxiliary circuit 32 may be adopted without departing from the spirit of the invention, as for instance, by causing the lamp 37 to be lighted, subject to be extinguished upon discovery of a defective sample.

It should be understood that the above described arrangement constitutes but one of a number of embodiments by means of which the invention is susceptible of being practiced, and it is intended therefore that the invention be not limited other than by the scope of the appended claims.

What is claimed is:

1. A testing device comprising means emitting a light beam of varying direction, a reflector in the path thereof having two distinct surfaces reflecting light into distinct regions respectively, and separate indicating means in said regions respectively.

2. A testing device according to claim 1 in which one of said indicating means comprises a photoelectric cell.

3. In a testing device, means emitting a light beam of varying direction, a reflector in the path thereof and having a substantially plane portion and a warped portion, variation indicating means in the path of the portion of the light beam reflected from the plane portion of the reflector, and variation indicating means in the path of the portion of the light beam reflected from the warped portion of the reflector.

4. In a testing device, means emitting a light beam of varying direction, a substantially plane reflector intercepting a portion of the light beam, a warped reflector intercepting another portion of the light beam, variation indicating means receiving the beam reflected from the plane reflector, and variation indicating means receiving the beam reflected from the warped reflector.

5. In a testing device, means responsive to variations in an electro-magnetic field including a pivoting mirror, a fixed source of light to illuminate the mirror, a substantially plane reflector and a warped reflector each receiving light from the source after reflection from the mirror, variation indicating means receiving the light after reflection from the plane reflector, and variation indicating means receiving the light after reflection from the warped reflector.

6. In a testing device, means emitting a light beam of varying direction, a substantially plane reflector intercepting a portion of the light beam, a warped reflector intercepting another portion of the light beam, a variation indicating scale intercepting the light beam reflected from one of the two reflectors, and light responsive means intercepting the light beam reflected from the other of the two reflectors to operate a signal means.

7. In a testing device, means emitting a light beam of varying direction, a substantially plane reflector intercepting a portion of the light beam, a scale receiving the light from the plane reflector to indicate directional variations thereof, a warped reflector intercepting another portion of the light beam, a photo-electric cell receiving light from the warped reflector, and signal means operated by the cell.

8. In a testing device, variation detecting means including a pivotal mirror, a fixed source of light to illuminate the mirror, an adjusting mirror to receive a light beam from the pivotal mirror, a substantially plane reflector to receive light from the adjusting mirror, a warped reflector to receive light also from the adjusting mirror, a graduated scale to receive light from one of the two reflectors, a photo-electric cell to receive light from the second of the two reflectors, a perforated delimiting screen interposed between the second reflector and the photo-electric cell, and signal means operated by the cell.

In witness whereof, I hereunto subscribe my name this 20 day of April, A. D. 1929.

LAUREL HERMAN BROWN.